United States Patent
Burdett et al.

(10) Patent No.: US 6,858,684 B2
(45) Date of Patent: Feb. 22, 2005

(54) PROCESSES FOR TRANSITIONING BETWEEN VARIOUS POLYMERIZATION CATALYSTS

(75) Inventors: Ian D. Burdett, Charleston, WV (US); Ping P. Cai, Hurricane, WV (US); Ronald Steven Eisinger, Charleston, WV (US); Mark Gregory Goode, Hurricane, WV (US); F. David Hussein, Cross Lanes, WV (US); Michael Allen Kinnan, Charleston, WV (US); Michael Elroy Muhle, Kingwood, TX (US); James L. Swecker, II, Hurricane, WV (US)

(73) Assignee: Univation Technologies, LLC, Houston, TX (US)

( * ) Notice: Subject to any disclaimer, the term of this patent is extended or adjusted under 35 U.S.C. 154(b) by 0 days.

(21) Appl. No.: 10/716,041

(22) Filed: Nov. 17, 2003

(65) Prior Publication Data

US 2004/0138391 A1 Jul. 15, 2004

Related U.S. Application Data

(60) Provisional application No. 60/437,091, filed on Dec. 30, 2002.

(51) Int. Cl.$^7$ .................................................. C08F 2/34
(52) U.S. Cl. ............................ 526/86; 526/83; 526/88; 526/901
(58) Field of Search ............................ 526/86, 83, 88, 526/901

(56) References Cited

U.S. PATENT DOCUMENTS

| | | | |
|---|---|---|---|
| 4,306,044 A | 12/1981 | Charsley | 526/84 |
| 4,460,755 A | 7/1984 | Williams et al. | 526/84 |
| 4,701,489 A | 10/1987 | Hughes et al. | 524/349 |
| 4,834,947 A | 5/1989 | Cook et al. | 422/117 |
| 5,227,438 A | 7/1993 | Rebhan | 526/82 |
| 5,270,408 A | 12/1993 | Craddock, III et al. | 526/82 |
| 5,371,053 A | 12/1994 | Agapiou et al. | 502/56 |
| 5,442,019 A | 8/1995 | Agapiou et al. | 526/82 |
| 5,672,665 A | 9/1997 | Agapiou et al. | 526/82 |
| 5,672,666 A | 9/1997 | Muhle et al. | 526/82 |
| 5,753,786 A | 5/1998 | Agapiou et al. | 526/82 |
| 6,359,084 B1 | 3/2002 | Herzog et al. | 526/84 |
| 6,388,027 B1 * | 5/2002 | Zilker et al. | 526/82 |

FOREIGN PATENT DOCUMENTS

| | | | |
|---|---|---|---|
| EP | 0116917 A1 | | 8/1984 |
| EP | 0471479 B1 | | 2/1992 |
| EP | 0811638 | * | 12/1997 |
| EP | 0829491 A2 | | 3/1998 |
| WO | WO 92/14766 | | 9/1992 |
| WO | WO 98/30599 | | 7/1998 |

* cited by examiner

*Primary Examiner*—Fred Teskin

(57) ABSTRACT

This invention relates to processes for transitioning among polymerization catalyst systems, preferably catalyst systems, which are incompatible with each other. Particularly, the invention relates to processes for transitioning among olefin polymerization reactions utilizing Ziegler-Natta catalyst systems, metallocene catalyst systems and chromium-based catalyst systems.

56 Claims, No Drawings

PROCESSES FOR TRANSITIONING BETWEEN VARIOUS POLYMERIZATION CATALYSTS

FIELD OF THE INVENTION

This invention relates to processes for transitioning among polymerization catalyst systems, preferably catalyst systems, which are incompatible with each other. Particularly, the invention relates to processes for transitioning among olefin polymerization reactions utilizing Ziegler-Natta catalyst systems, metallocene catalyst systems and chromium-based catalyst systems.

BACKGROUND OF THE INVENTION

Transitioning at low bed levels have been practiced commercially in fluidized bed polymerization reactors for several years when operates are to be transitioned from one product type to other or transitioned to a different catalyst system. Successful low bed transitions can dramatically reduce transitioning timer and provide substantially reduced amount of off-grade product production. But under conventional practices, wherein low bed levels are accomplished, for example, by controlling the reactor discharge system to provide an increased discharge rates, catastrophic operability problems tend to occur for about 1 out of every 10 such transitions. While the occurrence of catastrophic operability problems at low bed levels have historically been about 10 percent, the 10 percent failure rate invariably diminishes all of the savings and gains from successful low bed transitions. Thus, there is an important need to improve low bed level transitions, especially when transitioning between incompatible catalyst systems.

Catalyst transitions involve transitioning from one type of catalyst system producing polymers having certain properties and characteristics to another catalyst system capable of producing polymers of different chemical and/or physical attributes. Transitioning between similar metallocene catalyst systems, or compatible catalyst systems, for instance, generally takes place easily. But, where the catalyst systems are incompatible or of different types, the process is typically complicated. For example, transitioning between two incompatible catalyst systems such as a metallocene catalyst system and a Ziegler-Natta catalyst system, it has been found that some of the components of the metallocene catalyst system act as poisons to the Ziegler-Natta catalyst system. Consequently, the components of the metallocene catalyst system prevent the Ziegler-Natta catalyst system from promoting polymerization.

In the past, to accomplish an effective transition between incompatible catalysts, the first catalyzed olefin polymerization process was stopped by various techniques known in the art. The reactor was then emptied, recharged and a second catalyst system was introduced into the reactor. Such catalyst conversions are time consuming and costly because of the need for a reactor shut-down for an extended period of time during transition.

It would be highly advantageous if the process for transitioning between incompatible polymerization catalyst systems could be accomplished at a substantial reduce time, thereby reducing the amount of off-grade material produced during the transition process and reactor down-time. It would also be advantageous to increase the robustness and stability of the transition process as well as avoid the need to open the reactor (to atmosphere) to charge a new seed bed.

SUMMARY OF THE INVENTION

The invention is drawn to processes for transitioning between at least two catalysts and/or catalyst systems in a polymerization process.

According to a preferred embodiment of the present invention, the polymerization process is conducted by the essentially continuous passage of monomer gases through the polymerization zone of a gas phase fluidized bed reactor that contains a fluidized bed of polymer particles. According to this embodiment, the process for transitioning from a first polymerization reaction conducted in the presence of a first catalyst system to a second polymerization reaction conducted in the presence of a second catalyst system wherein the first and second catalyst systems are incompatible, comprises:

a) discontinuing the introduction of the first catalyst system into the reactor;

b) lowering the height of the bed of polymer particles from a first height to a second height;

c) introducing the second catalyst system into the reactor; and d) increasing the height of the bed of polymer particles to a level above the level of the second height.

More preferably, the processes of the present invention include conducting essentially concurrently with the reduction of the height of the bed of polymer particles, at least one modification selected from the group consisting of:

reducing the partial pressure of the monomer gases within the polymerization zone from a first partial pressure to a second lower partial pressure;

reducing the velocity of the monomer gases passing through the reactor from a first velocity to a second velocity; and introducing a transition agent, preferably, an alkoxylated amide or amine transition agent, into the reactor.

According to another preferred embodiment of the present invention, the polymerization process is conducted by the essentially continuous passage of monomer gases through the polymerization zone of a gas phase fluidized bed reactor that contains a fluidized bed of polymer particles. According to this embodiment, the process for transitioning from a first polymerization reaction conducted in the presence of a first catalyst system to a second polymerization reaction conducted in the presence of a second catalyst system, comprises:

a) discontinuing the introduction of the first catalyst system into the reactor;

b) lowering the height of the bed of polymer particles from a first height to a second height;

c) essentially concurrently with the reduction of the height of the bed of polymer particles, reducing the entrainment of fines from the fluidized bed of polymer particles;

d) introducing the second catalyst system into the reactor; and e) increasing the height of the bed of polymer particles to a level above the level of the second height.

More preferably, the entrainment of fines is reduced by at least one modification selected from the group consisting of:

reducing the velocity of the monomer gases passing through the reactor from a first velocity to a second velocity;

reducing the total pressure in the reactor;

reducing the cycle gas density;

increasing the average particle size of polymer particles in the fluidized bed;

narrowing the particle size distribution of polymer particles in the fluidized bed; and changing the morphology of the particles whereby the sphericity of the particles is reduced.

According to yet another preferred embodiment of the present invention, the polymerization process is conducted by the essentially continuous passage of monomer gases through the polymerization zone of a gas phase fluidized bed reactor that contains a fluidized bed of polymer particles. According to this embodiment, the process for transitioning from a first polymerization reaction conducted in the presence of a first catalyst system to a second polymerization reaction conducted in the presence of a second catalyst system, comprises:

a) discontinuing the introduction of the first catalyst system into the reactor;

b) lowering the height of the bed of polymer particles from a first height to a second height;

c) essentially concurrently with the reduction of the height of the bed of polymer particles, reducing the fluidized bulk density of the fluidized bed of polymer particles;

d) introducing the second catalyst system into the reactor; and e) increasing the height of the bed of polymer particles to a level above the level of the second height.

More preferably, the fluidized bulk density is reduced by at least one modification selected from the group consisting of:

increasing the velocity of the monomer gases passing through the reactor from a first velocity to a second velocity;

increasing the cycle gas density;

selecting a second catalyst that produces a product having a lower fluidized bulk density particle or one that produces a lower fluidized density than the product produced by the first catalyst;

reducing the average particle size of polymer particles in the fluidized bed; and changing the morphology of the particles whereby the sphericity of the particles is reduced.

According to still another preferred embodiment of the present invention, the polymerization process is conducted by the essentially continuous passage of monomer gases through the polymerization zone of a gas phase fluidized bed reactor that contains a fluidized bed of polymer particles. According to this embodiment; the process for transitioning from a first polymerization reaction conducted in the presence of a first catalyst system to a second polymerization reaction conducted in the presence of a second catalyst system, comprises:

a) discontinuing the introduction of the first catalyst system into the reactor;

b) introducing a poison, inhibitor or retarder to the first catalyst system to inhibit the first polymerization reaction;

c) lowering the height of the bed of polymer particles from a first height to a second height, d) essentially concurrently with the lowering of the height of the bed of polymer particles the partial pressure of the monomer gases within the polymerization zone is reduced from a first partial pressure to a second lower partial pressure;

e) essentially concurrently with the lowering of the height of the bed of polymer particles the velocity of the monomer gases passing through the reactor is modified from a first velocity to a second velocity;

f) introducing the second catalyst system into the reactor;

g) increasing the height of the bed of polymer particles to a level above the level of the second height; and h) essentially concurrently with the increase of the height of the bed of polymer particles to the second height, the partial pressure of the monomer gases within the polymerization zone is increased to a level above the second partial pressure and the velocity of the monomer gases passing through the reactor is adjusted to the first velocity.

Another embodiment of the invention is a process for transitioning from a first polymerization reaction producing a first polymer to a second polymerization reaction producing a second polymer, wherein both the first and second polymers are produced in presence of the same polymerization catalyst system, the polymerization reaction being conducted in a polymerization zone of a gas phase fluidized bed reactor that contains a fluidized bed of polymer particles by the essentially continuous passage of monomer gases through the polymerization zone and the polymers are discharged from the reactor into a discharge system, comprising:

a) discontinuing the introduction of the catalyst system into the reactor, b) lowering the height of the bed of polymer particles from a first height to a second height by controlling the discharge system to provide an increased discharge rate;

c) setting the reactor conditions to produce the second polymer; and d) increasing the height of the bed of polymer particles to a level above the level of the second height.

DETAILED DESCRIPTION OF THE INVENTION

The invention relates to improved low bed level transitions. In particular, the invention relates to processes for low bed level transitioning between catalysts and/or catalyst systems to convert a reactor from producing one type of product to another with minimal reactor down-time.

In particular, preferred processes are drawn to transitioning between Ziegler-Natta catalysts/catalyst systems and metallocene catalysts/catalyst systems. For the purposes of this patent specification and appended claims the terms "catalyst" and "catalyst system" shall be used interchangeably and shall have the identical meaning. The term "low bed level" is used herein to mean that the fluidizing bed height has been reduced from about 40 to about 50 percent of its normal height as measured during steady state operations. At low bed levels, the bed height is reduced to a height that is at least 25 percent, preferably at least 35 percent, more preferably at least 50 percent and most preferably at least 70 percent of the length of the straight section of the polymerization reactor. Bed height is conventionally lowered by increasing the product discharge rate from the reactor to downstream equipment e.g. a purge bin. Other conventional techniques for lowering bed height are known in the art.

The processes of the present invention preferably are used in gas phase, solution phase, slurry or bulk phase polymerization processes. Most preferably, the processes of the present invention are used in a gas phase polymerization process in a fluidized bed reactor.

In a typical continuous gas fluidized bed polymerization process for the production of polymer from monomer, a gaseous stream comprising monomer is passed through a fluidized bed reactor in the presence of a catalyst under reactive conditions. A polymer product is withdrawn from the fluidized bed reactor. Also withdrawn from the reactor is a cycle gas stream, which is continuously circulated and usually cooled. The cycle gas stream is returned to the reactor together with additional monomer sufficient to replace the monomer consumed in the polymerization reaction. For detailed descriptions of gas phase fluidized bed polymerization processes, see U.S. Pat. Nos. 4,543,399 and 4,588,790, 5,028,670, 5,352,769 and 5,405,922, the disclosures of which are hereby fully incorporated herein by reference.

For a given catalyst to produce a given product of a certain density and melt index, which generally depends on how well a catalyst incorporates comonomer, a certain gas composition must be present in the reactor.

Generally the gas contains at least one alpha-olefin having from 2 to 20 carbon atoms, preferably 2–15 carbon atoms, for example, ethylene, propylene, butene-1, pentene-1, 4-methylpentene-1, hexene-1, octene-1, decene-1 and cyclic olefins such as styrene. Other monomers can include polar vinyl, dienes, norbornene, acetylene and aldehyde monomers. In the preferred embodiments of the present invention, the gas composition contains ethylene and at least one alpha-olefin having 3 to 15 carbon atoms, most preferably butene-1, hexene-1 or octene-1 is selected as the at least one alpha-olefin.

Typically, the gas composition also contains an amount of hydrogen to control the melt index of the polymer to be produced. In typical circumstances the gas also contains an amount of dew point increasing component with the balance of the gas composition made up of a non-condensable inerts, for example, nitrogen.

Depending on the second catalyst to be introduced into the reactor the gas composition, such as the comonomer and hydrogen gas concentrations, can be increased or decreased.

When transitioning between compatible catalysts, there are typically only slight differences in catalyst performance with regard to hydrogen and comonomer. But when transitioning between incompatible catalysts, the interrelationships and performance differences are not straightforward. For example, conventional Ziegler-Natta catalyst systems and metallocene catalyst systems have extremely different responses to molecular weight regulators, such as hydrogen and comonomer, and as such these catalysts are considered to be incompatible. Any traces of active Ziegler-Natta catalyst will produce very high molecular weight product under metallocene catalyst reactor conditions. Furthermore, particularly in a continuous transition process, the interaction between two incompatible catalysts may lead to production of high levels of small particles less than 100 microns, that is, may lead to fines. These fines can cause operability problems in the reactor such as fouling and sheeting. Applicants have discovered various processes for transitioning between two or more catalysts, including incompatible catalysts, that are particularly useful in a continuous gas phase polymerization process, thus, mitigating or eliminating the problems mentioned above.

During the transition from a first catalyst to a second catalyst, particularly in a continuous process, it is reasonable to expect that interaction or contact of the two catalysts will occur. For compatible catalysts, the transition normally occurs by discontinuing the feed of the first catalyst while commencing the feed of the second catalyst. Typically it takes many hours until the first catalyst is entirely consumed. So, for a relatively long period of time the resin produced is a mixture from both the first and the second catalyst.

Compatible catalysts are those catalysts having similar kinetics of termination and insertion of monomer and comonomer(s) and/or do not detrimentally interact with each other.

For the purposes of this patent specification and appended claims the term "incompatible catalysts" shall refer to and mean catalysts that satisfy one or more of the following:

1) those catalysts that when present together reduce the activity of at least one of the catalysts by greater than 50%;

2) those catalysts that under the same reactive conditions produce polymers such that one of the polymers has a molecular weight that is more than twice the molecular weight of the other polymer; and 3) those catalysts that differ in comonomer incorporation or reactivity ratio under the same conditions by more than about 30%.

The processes of the present invention are applicable to any transition between catalysts especially incompatible catalysts. For example, transitioning between a Ziegler-Natta catalyst and a metallocene catalyst or transitioning between a chromium catalyst and a metallocene catalyst or between a Ziegler-Natta catalyst and a chromium catalyst. The present invention contemplates that the direction of transition between incompatible catalysts is not limiting, however, it is preferred that the process of the invention transition from any other catalyst incompatible with a metallocene catalyst.

According to a preferred embodiment of the present invention, the process is one for transitioning from a first polymerization reaction conducted in the presence of a first catalyst system to a second polymerization reaction conducted in the presence of a second catalyst system wherein the first and second catalyst systems are incompatible.

According to this process in a steady-state operation with the first catalyst system, the rate of production of polymer is reduced by lowering or completely stopping the catalyst and cocatalyst (if present) feed into the reactor while continuing to discharge polymer product from the reactor so as to lower the height of the fluidized bed as the polymerization reaction rate declines. The present invention contemplates various operation modifications at this stage that may be used separately or in combination.

One preferred operation modification includes the addition of a poison or behavior modifier for the first catalyst and cocatalyst (if present). The poison or behavior modifier further reduces the rate of reaction of the first polymerization reaction or chemically reacts with the first catalyst or cocatalyst to prevent these components from interfering with the reactivity and operability of the second catalyst or cocatalyst.

Another preferred operation modification includes, discontinuing or reducing the feeds of monomer, comonomer and hydrogen such that the partial pressure or concentration of these gases in the reactor is reduced. According to this operation modification, an inert gas such as nitrogen may be optionally introduced to the reactor to maintain a desired total pressure as the partial pressure of the monomer, comonomer and hydrogen declines.

Still another preferred operation modification includes altering the cycle gas velocity through the fluidized bed. In one aspect, the cycle gas velocity is increased which results in raising the level of the fluidized bed or particles within the reactor while reducing the fluidized bulk density. Consequently, the weight of the fluidized bed is reduced while maintaining adequate height to minimize sheeting in the expanded section of the reactor. In another aspect, the cycle gas velocity is reduced which (for the region or reactor volume above the fluidizing bed results) in a reduction in entrained active catalyst species and/or fines which consequently precludes the onset or occurrence of reactor wall fouling above the height of the fluidized bed.

According to this process of the present invention, the weight of the fluidized bed is allowed to drop to at least 50 percent of the steady-state operating bed weight and more preferably from 10 to 30 percent of bed weight. The magnitude of the bed reduction may be limited by the need to retain the level of the bed at least to the height of the catalyst injection level.

According to a preferred embodiment, the level of resin downstream of the reactor (for example, the level of resin in a purge bin) is lowered prior to the initiation of transition. A reduction in the level of resin in downstream process equipment will permit the polymer particles to be removed from the reactor at a higher rate so as to reduce the time involved in reducing the bed level to a desired target height.

According to yet another preferred embodiment, the walls of the reactor above the declining resin bed are kept clean by various techniques well known to those of ordinary skill in the art. Known wall cleaning techniques include, for example, using acoustic or sonic hammers, tangential flow cleaning systems, external wall temperature control systems, and periodic reactor blow-down cycles.

As the bed weight in the reactor is reduced or reaches its lowest point, more poison or a different poison or catalyst behavior modifier may be added. Once the bed weight has reached a desired level, transition to a new catalyst or to the production or a new product can begin.

If a catalyst transition is to be performed, poison or modifier may be added to the reactor to ensure that the first catalyst is no longer active or likely to negatively impact the operation or effectiveness of the second catalyst. Once this point is reached, the introduction of the second catalyst system and its cocatalysts can be started. According to a preferred embodiment, after the introduction of the second catalyst, the partial pressures of the monomer, comonomer and hydrogen gas in the reactor are maintained at a low level, below a steady-state level, and are raised gradually as the bed builds and the production rate increases.

According to another preferred embodiment, a second catalyst is used that has been modified (i.e. retarded or inhibited such as by the introduction of a reversible catalyst kill or poison) to be less active, more operable and thus less likely to create wall fouling within the reactor. According to this embodiment, once steady-state operations at normal bed height are achieved, for an acceptable number of bed turnovers, the second catalyst is re-modified or allowed to return to its normal activity or a third catalyst may be introduced into the reactor. A suitable third catalyst would have a higher activity than the second catalyst or the modified second catalyst and it can actually be the second catalyst unmodified or the second catalyst without any retarder, inhibitor or reversible catalyst kill or poison present.

According to yet another embodiment, the cycle gas velocity is manipulated to enhance the effectiveness of the operation at below normal bed heights so as to minimize entrainment of fines and to keep the fluidized bulk density at a low level. According to still another embodiment, no or limited discharge of resin product is taken to allow the fluidized bed of resin within the reactor to rise rapidly. Once the normal or a desired bed level is reached, the recycle gas velocity and the partial pressures of monomers, comonomers and hydrogen are adjusted to steady-state levels. In addition, once the operation has stabilized, the second catalyst is changed to its standard state or the reaction is allowed to continue with the third catalyst.

In case the transition is a product transition, a modified first catalyst may be used as needed for reactor stability until normal steady-state operations are achieved.

According to another preferred embodiment of the present invention, the resin produced by the polymerization process catalyzed by the first catalyst system is completely discharged so that the fluidized bed within the reactor is completely discharged and a new fluidized bed of resin particles is added to the reactor from a seed bin or hopper car. Preferably, the amount added would be the minimum necessary to initiate the polymerization reaction catalyzed by the second catalyst. The seed bed would be made with the second catalyst and preferably has properties as close as possible to the desired polymer product.

According to yet another embodiment of the present invention, the fluidized bulk density of the polymer in the reactor is lowered prior to transition from the production of one product to another. Transitions from one product to another commercially produce a large amount of off-grade product that either has to be discarded or subsequently treated. This is due to the inherent nature of a fluidized bed reactor in which all of the material produced by the first reaction and catalyst system must be discharged from the reactor and due to the well-mixed fluidized system, a large amount of off-grade product is generated. For some catalyst families, it is desirable to operate at the neck of a fluidized bed reactor, so lowering the bed level is not a desirable option. Lined-out operation also desires a high fluidized bulk density of the resin produced so that production rate is not limited by the amount of product that can be discharged from the reactor. By lowering the fluidized bulk density prior to the transition, however, the weight of the polymer in the reactor is lower and thus the amount of pounds of the first product to be removed is also reduced. This leads to a reduction in the amount of off-grade product produced during a transition.

According to this embodiment of the present invention, the fluidized bulk density of the polymer in the reactor can be lowered in several ways. Specifically, the fluidized bulk density can be lowered by:

1) raising the velocity of the cycle gas;
2) increasing the density of the cycle gas through pressure, gas composition and/or temperature modifications;
3) transitioning to a catalyst that produces a lower fluidized bulk density particle or one that produces a lower fluidized bulk density while retaining a high settled bulk density;
4) operating to generate a smaller average particle size; or
5) operating to produce resin particles that are characterized as having less sphericity.

In processes that tend to result in wall fouling, this embodiment of the present invention achieves the goal of reducing bed inventory during a product transition without causing wall fouling problems as may otherwise be experienced for a low bed level transition.

During product transition, a large quantity of off-grade product is generated in a fluidized bed polymerization reactor because of the continuous stirred reactor mixing pattern of the particle phase. Reducing the reactor inventory by lowering the level of the fluidized bed during product transition is an efficient way to reduce the quantity of off-grade product. However, low bed level operation of a fluidized bed reactor is limited by the occurrence of fouling and sheeting on the reactor wall above the fluidized bed level. While not desiring to be limited to a particular mode of operation, it is believed that fouling and sheeting is initiated and caused by fines entrained from the fluidized bed. Accordingly, if the entrainment of fines can be significantly reduced, fouling and the formation of sheets could be eliminated or substantially reduced. The present embodiment of the invention, provides various techniques for reducing entrainment of fines during product transition. Specifically, the techniques for reducing entrainment of fines include:

1) reducing the cycle gas velocity to about 1 to about 1.5 ft/sec or from about 1.5 to about 10 times, preferably from about 3 to about 8 times the minimum velocity required to fluidize particles (which varies with bulk density);

2) reducing the total reactor pressure to a pressure in the range of about 50 to about 250 psi;

3) reducing the cycle gas density to a density in the range of about 0.5 to about 1.2 lb/ft$^3$;

4) increasing the average particle size of the polymer product to a size in the range of about 0.025 to about 0.15 inches;

5) narrowing the particle size distribution to have from 0 to about 2 weight-percent of fines passing US 120 mesh or where; or about 0 to about 2 weight-percent of fines are less than 125 microns;

6) changing the particle morphology to reduce the sphericity of the particles to a sphericity in the range of 0.3 to 0.7 (wherein 1.0 is indicative of perfectly spherical particles).

According to another preferred embodiment of the present invention, a method is defined for operating a gas phase fluidized bed polymerization process at a reduced bed level well below the neck of the transition section for an extended period of time without operational problems such as expanded section sheeting or resin accumulation in the freeboard section by the use of transition agents such as either an antistatic agent, compounds that have a calming effect on reactor operability (e.g. reduce the incidences of erratic static generation and/or large reactor wall temperature swings) or a resin flow aid or combinations thereof. According to this embodiment, this can be accomplished by the addition of a transition agent, especially, an alkoxylated amine or amide material. Preferably, the alkoxylated amine or amide material comprises an ethoxylated fatty acid amine. Most preferably, the alkoxylated amine or amide material comprises ethoxylated stearyl amine that is commercially available from Witco Chemical Corporation under the tradename AS-990. The transition agent and especially the alkoxylated amine or amide material can be added to the fluidized bed continuously and/or preferably to maintain a concentration ranging from about 1 to about 1000 ppm by weight (ppmw) based on the bed weight, more preferably to maintain a concentration from about 5 to about 35 ppmw, most preferably, from about 15 to about 25 ppmw during the transition process. Other suitable transition agents include ATMER 163, LAROSTAT 519, 1-malic acid, dicop salts, talc, aluminum stearate, stearic acid and oleic acid. Those of ordinary skill in the art will recognize that this process of the present invention may also be utilized in a linked reactor operation in which the residence time and thus the split of resin material made in each reactor can be controlled by lowering the height of the fluidized bed.

All polymerization catalysts including conventional-type Ziegler-Natta transition metal catalysts and bulky ligand metallocene-type catalysts are suitable for use in the processes of the present invention. The following is a non-limiting discussion of the various polymerization catalysts useful in the invention.

Conventional-Type Transition Metal Catalysts

Conventional-type transition metal catalysts are those traditional Ziegler-Natta catalysts and Phillips-type catalysts that are well known in the art. Examples of conventional-type transition metal catalysts are discussed in U.S. Pat. Nos. 4,115,639, 4,077,904, 4,482,687, 4,564,605, 4,721,763, 4,879,359 and 4,960,741, the disclosures of which are hereby fully incorporated herein by reference. The conventional-type transition metal catalyst compounds that may be used in the present invention include transition metal compounds from Groups 3 to 17, preferably 4 to 12, more preferably 4 to 6 of the Periodic Table of Elements.

These conventional-type transition metal catalysts may be represented by the formula: MRx, where M is a metal from Groups 3 to 17, preferably Groups 4 to 6, more preferably Group 4, most preferably titanium; R is a halogen or a hydrocarbyloxy group; and x is the valence of the metal M. Non-limiting examples of R include alkoxy, phenoxy, bromide, chloride and fluoride. Non-limiting examples of conventional-type transition metal catalysts where M is titanium include TiCl$_4$, TiBr$_4$, Ti(OC$_2$H$_5$)$_3$Cl, Ti(OC$_2$H$_5$)Cl$_3$, Ti(OC$_4$H$_9$)$_3$Cl, Ti(OC$_3$H$_7$)$_2$Cl$_2$, Ti(OC$_2$H$_5$)$_2$Br$_2$, TiCl$_3$.⅓AlCl$_3$ and Ti(OC$_{12}$H$_{25}$)Cl$_3$.

Conventional-type transition metal catalyst compounds based on magnesium/titanium electron-donor complexes that are useful in the invention are described in, for example, U.S. Pat. Nos. 4,302,565 and 4,302,566, the disclosures of which are hereby fully incorporated herein by reference. The MgTiCl$_6$ (ethyl acetate)$_4$ derivative is particularly preferred.

British Patent Application No. 2,105,355 and U.S. Pat. No. 5,317,036, the disclosures of which are hereby incorporated herein by reference, describe various conventional-type vanadium catalyst compounds. Non-limiting examples of conventional-type vanadium catalyst compounds include vanadyl trihalide, alkoxy halides and alkoxides such as VOCl$_3$, VOCl$_2$(OBu), where "Bu" means "butyl" and VO(OC$_2$H$_5$)$_3$; vanadium tetrahalide and vanadium alkoxy halides such as VCl$_4$ and VCl$_3$ (OBu); vanadium and vanadyl acetyl acetonates and chloroacetyl acetonates such as V(AcAc)$_3$ and VOCl$_2$(AcAc) where (AcAc) is an acetyl acetonate. The preferred conventional-type vanadium catalyst compounds are VOCl$_3$, VCl$_4$ and VOCl$_2$—OR, where R is a hydrocarbon radical, preferably a C$_1$ to C$_{10}$ aliphatic or aromatic hydrocarbon radical such as ethyl, phenyl, isopropyl, butyl, propyl, n-butyl, iso-butyl, tertiary-butyl, hexyl, cyclohexyl, naphthyl, etc., and vanadium acetyl acetonates.

Conventional-type chromium catalyst compounds, often referred to as Phillips-type catalysts, suitable for use in the present invention include CrO$_3$, chromocene, silyl chromate, chromyl chloride (CrO$_2$Cl$_2$), chromium-2-ethyl-hexanoate, chromium acetylacetonate (Cr(AcAc)$_3$), and the like. Non-limiting examples are disclosed in U.S. Pat. Nos. 3,709,853, 3,709,954, 3,231,550, 3,242,099 and 4,077,904, the disclosures of which are hereby fully incorporated herein by reference.

Still other conventional-type transition metal catalyst compounds and catalyst systems suitable for use in the present invention are disclosed in U.S. Pat. Nos. 4,124,532, 4,302,565, 4,302,566, 4,376,062, 4,379,758, 5,066,737, 5,763,723, 5,849,655, 5,852,144, 5,854,164 and 5,869,585 and published EP-A2 0 416 815 A2 and EP-A1 0 420 436, the disclosures of which are hereby fully incorporated herein by reference.

Other catalysts may include cationic catalysts such as AlCl$_3$, and other cobalt, iron, nickel and palladium catalysts well known in the art. See for example U.S. Pat. Nos. 3,487,112, 4,472,559, 4,182,814 and 4,689,437, the disclosures of which are hereby fully incorporated herein by reference.

For more details on Ziegler-Natta catalysts, see for example, U.S. Pat. Nos. 3,687,920, 4,086,408, 4,376,191, 5,019,633, 4,482,687. 4,101,445, 4,560,671, 4,719,193, 4,755,495, 5,070,055, the disclosures of which are hereby incorporated herein by reference.

Typically, these conventional-type transition metal catalyst compounds excluding some conventional-type chromium catalyst compounds are activated with one or more of the conventional-type cocatalysts described below.

Conventional-Type Cocatalysts

Conventional-type cocatalyst compounds for the above conventional-type transition metal catalyst compounds may be represented by the formula $M_3M_4vX_2cR_3b\text{-}c$, wherein $M_3$ is a metal from Group 1 to 3 and 12 to 13 of the Periodic Table of Elements; $M_4$ is a metal of Group 1 of the Periodic Table of Elements; v is a number from 0 to 1; each $X_2$ is any halogen; c is a number from 0 to 3; each $R_3$ is a monovalent hydrocarbon radical or hydrogen; b is a number from 1 to 4; and wherein b minus c is at least 1. Other conventional-type organometallic cocatalyst compounds for the above conventional-type transition metal catalysts have the formula $M_3R_3k$, where $M_3$ is a Group IA, IIA, IIB or IIIA metal, such as lithium, sodium, beryllium, barium, boron, aluminum, zinc, cadmium, and gallium; k equals 1, 2 or 3 depending upon the valency of $M_3$ which valency in turn normally depends upon the particular Group to which $M_3$ belongs; and each $R_3$ may be any monovalent radical that include hydrocarbon radicals and hydrocarbon radicals containing a Group 13 to 16 element like fluoride, aluminum or oxygen or a combination thereof.

Non-limiting examples of conventional-type organometallic cocatalyst compounds useful with the conventional-type catalyst compounds described above include methyllithium, butyllithium, dihexylmercury, butylmagnesium, diethylcadmium, benzylpotassium, diethylzinc, tri-n-butylaluminum, diisobutyl ethylboron, diethylcadmium, di-n-butylzinc and tri-n-amylboron, and, in particular, the aluminum alkyls, such as tri-hexyl-aluminum, triethylaluminum, trimethylaluminum, and tri-isobutylaluminum. Other conventional-type cocatalyst compounds include mono-organohalides and hydrides of Group 2 metals, and mono- or di-organohalides and hydrides of Group 3 and 13 metals. Non-limiting examples of such conventional-type cocatalyst compounds include di-isobutylaluminum bromide, isobutylboron dichloride, methyl magnesium chloride, ethylberyllium chloride, ethylcalcium bromide, di-isobutylaluminum hydride, methylcadmium hydride, diethylboron hydride, hexylberyllium hydride, dipropylboron hydride, octylmagnesium hydride, butylzinc hydride, dichloroboron hydride, di-bromo-aluminum hydride and bromocadmium hydride. Conventional-type organometallic cocatalyst compounds are known to those in the art and a more complete discussion of these compounds may be found in U.S. Pat. Nos. 3,221, 002 and 5,093,415, the disclosures of which are hereby fully incorporated herein by reference.

Bulky Ligand Metallocene-Type Catalyst Compounds

Generally, bulky ligand metallocene-type catalyst compounds include half and full sandwich compounds having one or more bulky ligands bonded to at least one metal atom. Typical bulky ligand metallocene-type compounds are generally described as containing one or more bulky ligand(s) and one or more leaving group(s) bonded to at least one metal atom. In one preferred embodiment, at least one bulky ligand is η-bonded to the metal atom, most preferably η5 -bonded to the metal atom.

The bulky ligands are generally represented by one or more open, acyclic, or fused ring(s) or ring system(s) or a combination thereof. These bulky ligands, preferably the ring(s) or ring system(s), are typically composed of atoms selected from Groups 13 to 16 atoms of the Periodic Table of Elements, preferably the atoms are selected from the group consisting of carbon, nitrogen, oxygen, silicon, sulfur, phosphorous, germanium, boron and aluminum or a combination thereof. Most preferably the ring(s) or ring system (s) are composed of carbon atoms such as but not limited to those cyclopentadienyl ligands or cyclopentadienyl-type ligand structures or other similar functioning ligand structure such as a pentadiene, a cyclooctatetraendiyl or an amide ligand. The metal atom is preferably selected from Groups 3 through 15 and the lanthanide or actinide series of the Periodic Table of Elements. Preferably the metal is a transition metal from Groups 4 through 12, more preferably Groups 4, 5 and 6, and most preferably the transition metal is from Group 4.

In one embodiment, the bulky ligand metallocene-type catalyst compounds of the invention are represented by the formula:

$$L^A L^B MQ_n \qquad (I)$$

where M is a metal atom from the Periodic Table of the Elements and may be a Group 3 to 12 metal or from the lanthanide or actinide series of the Periodic Table of Elements, preferably M is a Group 4, 5 or 6 transition metal, more preferably M is a Group 4 transition metal, even more preferably M is zirconium, hafnium or titanium. The bulky ligands, $L^A$ and $L^B$, are open, acyclic or fused ring(s) or ring system(s) such as unsubstituted or substituted, cyclopentadienyl ligands or cyclopentadienyl-type ligands, heteroatom substituted and/or heteroatom containing cyclopentadienyl-type ligands. Non-limiting examples of bulky ligands include cyclopentadienyl ligands, cyclopentaphenanthreneyl ligands, indenyl ligands, benzindenyl ligands, fluorenyl ligands, octahydrofluorenyl ligands, cyclooctatetraendiyl ligands, azenyl ligands, azulene ligands, pentalene ligands, phosphoyl ligands, pyrrolyl ligands, pyrozolyl ligands, carbazolyl ligands, borabenzene ligands and the like, including hydrogenated versions thereof, for example tetrahydroindenyl ligands. In one embodiment, $L^A$ and $L^B$ may be any other ligand structure capable of t-bonding to M, preferably $\eta^3$-bonding to M and most preferably $\eta^5$-bonding. In yet another embodiment, the atomic molecular weight ($M_W$) of $L^A$ and $L^B$ exceeds 60 a.m.u., preferably greater than 65 a.m.u. In another embodiment, $L^A$ and $L^B$ may comprise one or more heteroatoms, for example, nitrogen, silicon, boron, germanium, sulfur, oxygen and phosphorous, in combination with carbon atoms to form an open, acyclic, or preferably a fused, ring or ring system, for example, a hetero-cyclopentadienyl ancillary ligand. Other $L^A$ and $L^B$ bulky ligands include but are not limited to bulky amides, phosphides, alkoxides, aryloxides, imides, carbolides, borollides, porphyrins, phthalocyanines, corrins and other polyazomacrocycles. Independently, each $L^A$ and $L^B$ may be the same or different type of bulky ligand that is bonded to M. In one embodiment of formula (I) only one of either $L^A$ or $L^B$ is present.

Independently, each $L^A$ and $L^B$ may be unsubstituted or substituted with a combination of substituent groups R. Non-limiting examples of substituent groups R include one or more from the group selected from hydrogen, or linear, branched alkyl radicals, or alkenyl radicals, alkynyl radicals, cycloalkyl radicals or aryl radicals, acyl radicals, aroyl radicals, alkoxy radicals, aryloxy radicals, alkylthio radicals, dialkylamino radicals, alkoxycarbonyl radicals, aryloxycarbonyl radicals, carbomoyl radicals, alkyl- or dialkyl-carbamoyl radicals, acyloxy radicals, acylamino radicals, aroylamino radicals, straight, branched or cyclic, alkylene radicals, or combination thereof. In a preferred embodiment, substituent groups R have up to 50 non-hydrogen atoms, preferably from 1 to 30 carbon, that can also be substituted with halogens or heteroatoms or the like. Non-limiting examples of alkyl substituents R include methyl, ethyl, propyl, butyl, pentyl, hexyl, cyclopentyl, cyclohexyl, benzyl or phenyl groups and the like, including all their isomers, for example tertiary butyl, isopropyl, and the like. Other hydrocarbyl radicals include fluoromethyl, fluroethyl, difluroethyl, iodopropyl, bromohexyl, chlorobenzyl and hydrocarbyl substituted organometalloid radicals including trimethylsilyl, trimethylgermyl, methyldiethylsilyl and the like; and halocarbyl-substituted organometalloid radicals including tris(trifluoromethyl)-silyl, methyl-bis (difluoromethyl)silyl, bromomethyldimethyl-germyl and the like; and disubstituted boron radicals including dimethylboron for example; and disubstituted pnictogen radicals including dimethylamine, dimethylphosphine, diphenylamine, methylphenylphosphine, chalcogen radicals including methoxy, ethoxy, propoxy, phenoxy, methylsulfide and ethylsulfide. Non-hydrogen substituents R include the atoms carbon, silicon, boron, aluminum, nitrogen, phosphorous, oxygen, tin, sulfur, germanium and the like, including olefins such as but not limited to olefinically unsaturated substituents including vinyl-terminated ligands, for example but-3-enyl, prop-2-enyl, hex-5-enyl and the like. Also, at least two R groups, preferably two adjacent R groups, are joined to form a ring structure having from 3 to 30 atoms selected from carbon, nitrogen, oxygen, phosphorous, silicon, germanium, aluminum, boron or a combination thereof. Also, a substituent group R group such as 1-butanyl may form a carbon sigma bond to the metal M.

Other ligands may be bonded to the metal M, such as at least one leaving group Q. For the purposes of this patent specification and appended claims, the term "leaving group" is any ligand that can be abstracted from a bulky ligand metallocene-type catalyst compound to form a bulky ligand metallocene-type catalyst cation capable of polymerizing one or more olefin(s). In one embodiment, Q is a monoanionic labile ligand having a sigma-bond to M.

Non-limiting examples of Q ligands include weak bases such as amines, phosphines, ethers, carboxylates, dienes, hydrocarbyl radicals having from 1 to 20 carbon atoms, hydrides or halogens and the like or a combination thereof. In another embodiment, two or more Q's form a part of a fused ring or ring system. Other examples of Q ligands include those substituents for R as described above and including cyclobutyl, cyclohexyl, heptyl, tolyl, trifluromethyl, tetramethylene, pentamethylene, methylidene, methyoxy, ethyoxy, propoxy, phenoxy, bis(N-methylanilide), dimethylamide, dimethylphosphide radicals and the like. Depending on the oxidation state of the metal, the value for n is 0, 1 or 2 such that formula (I) above represents a neutral bulky ligand metallocene-type catalyst compound.

In one embodiment, the bulky ligand metallocene-type catalyst compounds of the invention include those of formula (I) where $L^A$ and $L^B$ are bridged to each other by a bridging group, A, such that the formula is represented by $$L^A A L^B M Q_n \quad (II)$$

These bridged compounds represented by formula (II) are known as bridged, bulky ligand metallocene-type catalyst compounds. $L^A$, $L^B$, M, Q and n are as defined above. Non-limiting examples of bridging group A include bridging groups containing at least one Group 13 to 16 atom, often referred to as a divalent moiety such as but not limited to at least one of a carbon, oxygen, nitrogen, silicon, boron, germanium and tin atom or a combination thereof. Preferably bridging group A contains a carbon, silicon, iron or germanium atom, most preferably A contains at least one silicon atom or at least one carbon atom. The bridging group A may also contain substituent groups R as defined above including halogens. Non-limiting examples of bridging group A may be represented by $R'_2C$, $R'_2Si$, $R'_2SiR'_2Si$, $R'_2Ge$, R'P, where R' is independently, a radical group which is hydride, hydrocarbyl, substituted hydrocarbyl, halocarbyl, substituted halocarbyl, hydrocarbyl-substituted organometalloid, halocarbyl-substituted organometalloid, disubstituted boron, disubstituted pnictogen, substituted chalcogen, or halogen or two or more R' may be joined to form a ring or ring system.

In one embodiment, the bulky ligand metallocene-type catalyst compounds are those where the R substituents on the bulky ligands $L^A$ and $L^B$ of formulas (I) and (II) are substituted with the same or different number of substituents on each of the bulky ligands. In another embodiment, the bulky ligands $L^A$ and $L^B$ of formulas (I) and (II) are different from each other.

Other bulky ligand metallocene-type catalyst compounds and catalyst systems useful in the invention may include those described in U.S. Pat. Nos. 5,064,802, 5,145,819, 5,149,819, 5,243,001, 5,239,022, 5,276,208, 5,296,434, 5,321,106, 5,329,031, 5,304,614, 5,677,401, 5,723,398, 5,753,578, 5,854,363, 5,856,547 5,858,903, 5,859,158 and 5,929,266 and PCT publications WO 93/08221, WO 93/08199, WO 95/07140, WO 98/11144, WO 98/41530, WO 98/41529, WO 98/46650, WO 99/02540 and WO 99/14221 and European publications EP-A-0 578 838, EP-A-0 638 595, EP-B-0 513 380, EP-A1-0 816 372, EP-A2-0 839 834, EP-B1-0 632 819, EP-B1-0 748 821 and EP-B1-0 757 996, all of which are herein fully incorporated by reference.

In one embodiment, bulky ligand metallocene-type catalyst compounds useful in the invention include bridged heteroatom, mono-bulky ligand metallocene-type compounds. These types of catalysts and catalyst systems are described in, for example, PCT publication WO 92/00333, WO 94/07928, WO 91/04257, WO 94/03506, WO 96/00244 and WO 97/15602 and U.S. Pat. Nos. 5,057,475, 5,096,867, 5,055,438, 5,198,401, 5,227,440 and 5,264,405 and European publication EP-A-0 420 436, all of which are herein fully incorporated by reference.

In this embodiment, the bulky ligand metallocene-type catalyst compound is represented by the formula:

$$L^C A J M Q_n \quad (III)$$

where M is a Group 3 to 16 metal atom or a metal selected from the Group of actinides and lanthanides of the Periodic Table of Elements, preferably M is a Group 4 to 12 transition metal, and more preferably M is a Group 4, 5 or 6 transition metal, and most preferably M is a Group 4 transition metal in any oxidation state, especially titanium; $L^C$ is a substituted or unsubstituted bulky ligand bonded to M; J is bonded to M; A is bonded to M and J; J is a heteroatom ancillary ligand; and A is a bridging group; Q is a univalent anionic ligand; and n is the integer 0, 1 or 2. In formula (III) above, $L^C$, A and J form a fused ring system. In an embodiment, $L^C$ of formula (II) is as defined above for $L^A$, A, M and Q of formula (III) are as defined above in formula (I). In formula (III) J is a heteroatom containing ligand in which J is an element with a coordination number of three from Group 15 or an element with a coordination number of two from Group 16 of the Periodic Table of Elements. Preferably, J contains a nitrogen, phosphorus, oxygen or sulfur atom with nitrogen being most preferred.

In another embodiment, the bulky ligand type metallocene-type catalyst compound is a complex of a metal, preferably a transition metal, a bulky ligand, preferably a substituted or unsubstituted pi-bonded ligand, and one or more heteroallyl moieties, such as those described in U.S. Pat. Nos. 5,527,752 and 5,747,406 and EP-B1-0 735 057, all of which are herein fully incorporated by reference.

In an embodiment, the bulky ligand metallocene-type catalyst compound is represented by the formula:

$$L^D MQ_2(YZ)X_n \qquad (IV)$$

where M is a Group 3 to 16 metal, preferably a Group 4 to 12 transition metal, and most preferably a Group 4, 5 or 6 transition metal; $L^D$ is a bulky ligand that is bonded to M; each Q is independently bonded to M and $Q_2$ (YZ) forms a unicharged polydentate ligand; A or Q is a univalent anionic ligand also bonded to M; X is a univalent anionic group when n is 2 or X is a divalent anionic group when n is 1; n is 1 or 2.

In formula (IV), L and M are as defined above for formula (I). Q is as defined above for formula (I), preferably Q is selected from the group consisting of —O—, —NR—, —$CR_2$— and —S—; Y is either C or S; Z is selected from the group consisting of —OR, —$NR_2$, —$CR_3$, —SR, —$SiR_3$, —$PR_2$, —H, and substituted or unsubstituted aryl groups, with the proviso that when Q is —NR— then Z is selected from one of the group consisting of —OR, —$NR_2$, —SR, —$SiR_3$, —$PR_2$ and —H; R is selected from a group containing carbon, silicon, nitrogen, oxygen, and/or phosphorus, preferably where R is a hydrocarbon group containing from 1 to 20 carbon atoms, most preferably an alkyl, cycloalkyl, or an aryl group; n is an integer from 1 to 4, preferably 1 or 2; X is a univalent anionic group when n is 2 or X is a divalent anionic group when n is 1; preferably X is a carbamate, carboxylate, or other heteroallyl moiety described by the Q, Y and Z combination.

In another embodiment of the invention, the bulky ligand metallocene-type catalyst compounds are heterocyclic ligand complexes where the bulky ligands, the ring(s) or ring system(s), include one or more heteroatoms or a combination thereof. Non-limiting examples of heteroatoms include a Group 13 to 16 element, preferably nitrogen, boron, sulfur, oxygen, aluminum, silicon, phosphorous and tin. Examples of these bulky ligand metallocene-type catalyst compounds are described in WO 96/33202, WO 96/34021, WO 97/17379 and WO 98/22486 and EP-A1-0 874 005 and U.S. Pat. No. 5,637,660, 5,539,124, 5,554,775, 5,756,611, 5,233,049, 5,744,417, and 5,856,258, the disclosures of which are hereby incorporated herein by reference.

In another embodiment, the bulky ligand metallocene-type catalyst compounds are those complexes known as transition metal catalysts based on bidentate ligands containing pyridine or quinoline moieties, such as those described in U.S. application Ser. No. 09/103,620 filed Jun. 23, 1998 and U.S. Pat. No. 6,103,357, the disclosures of which are hereby incorporated herein by reference. In another embodiment, the bulky ligand metallocene-type catalyst compounds are those described in PCT publications WO 99/01481 and WO 98/42664, the disclosures of which are hereby fully incorporated herein by reference.

In one embodiment, the bulky ligand metallocene-type catalyst compound is represented by the formula:

$$((Z)XA_t(YJ))_q MQ_n \qquad (V)$$

where M is a metal selected from Group 3 to 13 or lanthanide and actinide series of the Periodic Table of Elements; Q is bonded to M and each Q is a monovalent, bivalent, or trivalent anion; X and Y are bonded to M; one or more of X and Y are heteroatoms, preferably both X and Y are heteroatoms; Y is contained in a heterocyclic ring J, where J comprises from 2 to 50 non-hydrogen atoms, preferably 2 to 30 carbon atoms; Z is bonded to X, where Z comprises 1 to 50 non-hydrogen atoms, preferably 1 to 50 carbon atoms, preferably Z is a cyclic group containing 3 to 50 atoms, preferably 3 to 30 carbon atoms; t is 0 or 1; when t is 1, A is a bridging group joined to at least one of X,Y or J, preferably X and J; q is 1 or 2; n is an integer from 1 to 4 depending on the oxidation state of M. In one embodiment, where X is oxygen or sulfur then Z is optional. In another embodiment, where X is nitrogen or phosphorous then Z is present. In an embodiment, Z is preferably an aryl group, more preferably a substituted aryl group.

Other Bulky Ligand Metallocene-Type Catalyst Compounds

It is within the scope of this invention, in one embodiment, that the bulky ligand 25 metallocene-type catalyst compounds include complexes of $Ni^{2+}$ and $Pd^{2+}$ described in the articles Johnson, et al., "New Pd(II)- and Ni(II)-Based Catalysts for Polymerization of Ethylene and a-Olefins", J. Am. Chem. Soc. 1995, 117, 6414–6415 and Johnson, et al., "Copolymerization of Ethylene and Propylene with Functionalized Vinyl Monomers by Palladium(II) Catalysts", J. Am. Chem. Soc., 1996, 118, 267–268, and WO 96/23010 published Aug. 1, 1996, WO 99/02472, U.S. Pat. Nos. 5,852,145, 5,866,663 and 5,880,241, the disclosures of which are hereby fully incorporated herein by reference. These complexes can be either dialkyl ether adducts, or alkylated reaction products of the described dihalide complexes that can be activated to a cationic state by the activators of this invention described below.

Also included as bulky ligand metallocene-type catalyst are those diimine based ligands of Group 8 to 10 metal compounds disclosed in PCT publications WO 96/23010 and WO 97/48735 and Gibson, et. al., Chem. Comm., pp. 849–850 (1998), the disclosures of which are hereby incorporated herein by reference.

Other bulky ligand metallocene-type catalysts are those Group S and 6 metal imido complexes described in EP-A2-0 816 384 and U.S. Pat. No. 5,851,945, the disclosures of which are hereby incorporated herein by reference. In addition, bulky ligand metallocene-type catalysts include bridged bis(arylamido) Group 4 compounds described by D. H. McConville, et al., in Organometallics 1195, 14, 5478–5480, the disclosure of which is hereby incorporated herein by reference. Other bulky ligand metallocene-type catalysts are described as bis(hydroxy aromatic nitrogen ligands) in U.S. Pat. No. 5,852,146, the disclosure of which is hereby incorporated herein by reference. Other metallocene-type catalysts containing one or more Group 15 atoms include those described in WO 98/46651, the disclosure of which is hereby incorporated herein by reference.

It is also contemplated that in one embodiment, the bulky ligand metallocene-type catalysts of the invention described above include their structural or optical or enantiomeric isomers (meso and racemic isomers, for example see U.S. Pat. No. 5,852,143, the disclosure of which is hereby incorporated herein by reference) and mixtures thereof.

EXAMPLES

In order to provide a better understanding of the present invention, the following examples are offered as related to actual tests performed in the practice of this invention.

Reactor and Equipment

The following examples were conducted in a fluidized bed reactor with a bis-indenyl metallocene catalyst system. The catalyst system was comprised of the reaction product of $(H_4Indenyl)_2$ $SiMe_2$—$ZrCl_2$) and methylalumoxane and was supported on silica and had 3 weight percent aluminum stearate and 0.5 weight percent AS-990 incorporated therein (based on the total weight of the catalyst system) as catalyst additives.

Experimental indicators of operability problems utilize the measurement of temperatures which exist at the wall of the reactor. The temperature can be measured using any appropriate device but in general thermocouple devices are the most common. Since the temperature being measured is close to the reactor wall or "skin", the thermocouples are referred to as skin thermocouples. Typically, the skin thermocouples are 5°–10° F. (1°–4° C.) below the internal bed temperature. Deviations from this baseline (which can be either positive or negative) are indicative of reactor operability problems.

Positive skin thermocouple deviations are the result of "hot spots" due to a localized run away reaction at the wall of the reactor. As the temperature continues to increase, it reaches the melting point of the polymer at which point a solid strip or sheet of polymer is formed and dislodged to the main body of the reactor resulting in severe operability problems. In many cases; several hours to days of a reactor shut down are required to remove the sheets before restarting the polymerization process.

Negative skin thermocouple deviations are generally less serious than positive deviations since negative deviations are indicative of "cold" polymer being situated at the wall of the reactor. But negative deviations can present a problem if they persist by causing a solid insulating layer of polymer to be formed at the reactor walls. If this layer continues to grow, it can transfer into a reactor sheet. This phenomenon is referred to as "cold bands." It has been found that the cold bands are often associated with the adherence of small polymer particles or "fines" to the wall of the reactor. Fines are generally defined as the percentage of the total distribution of particles passing through a 120 mesh standard sieve (that is, the percentage of particles having a size less than or equal to 120 microns). Fines are important since high levels can lead to sheeting and fouling of the reactor cycle gas system. This results in heat exchanger and/or distributor plate fouling requiring a reactor shut down for clean-out.

The cone angle of the transition section of the gas phase reactor was 15 degrees off vertical. The cone was about 1.7 feet high with a diameter of about 12.6 inches at the bottom and 22.6 inches at the top. The straight section of the reactor extended from the distributor plate to the cone, a distance of about 10 feet. The normal bed height was about 8 feet as calculated from bed weight and fluidized bed density. Rubble from each drum of resin (if present), was screened through half inch openings, collected and weighed to provide a record of low bed level performance.

Standard Fluidized-Bed Polymerization Conditions

The polymerization was conducted in a continuous gas phase fluidized bed reactor. The fluidized bed was made up of polymer granules. The gaseous feed streams of ethylene and hydrogen together with liquid comonomer (hexene) were mixed together in a mixing tee arrangement and introduced below the reactor bed into the cycle gas line. The individual flow rates of ethylene, hydrogen and comonomer were controlled to maintain fixed composition targets. The ethylene concentration was controlled to maintain a desired ethylene partial pressure, typically about 200 to 220 psi. The hydrogen partial pressure was controlled to maintain a constant hydrogen to ethylene mole ratio. The concentration of all the gases were measured by an on-line gas chromatograph to ensure relatively constant composition in the cycle gas stream.

The support MAO/bis-indenyl metallocene catalyst system described above was injected directly into the fluidized bed as a dry powder from a shot feeder, entering the reactor at about the 2 ft level above the distributor plate with nitrogen gas carrier assist. The catalyst injection rate was adjusted to maintain a constant production rate. The reacting bed of growing polymer particles was maintained in a fluidized stated by the continuous flow of the make up feed and cycle gas through the reaction zone at a cycle gas velocity of about 2.1 to 2.4 ft/sec. The reactor was operated at a total pressure of 350 psig. To maintain a constant reactor temperature, the temperature of the cycle gas was continuously adjusted up or down to accommodate any changes in the rate of heat generation due to the polymerization.

The fluidized bed was maintained at a constant height by withdrawing a portion of the bed at a rate equal to the rate of formation of particulate product. The product was removed semi-continuously via a series of valves into a fixed volume chamber, which was simultaneously vented back to the reactor. This allowed for highly efficient removal of the product, while at the same time recycled a large portion of the unreacted gases back to the reactor. The product was purged to remove entrained hydrocarbons and treated with a small stream of humidified nitrogen to deactivate any trace quantities of residual active catalyst species.

A conventional voltage static probe was located at about the 1.5-foot level above the distributor plate. The reactor was equipped with twenty-six thermocouples mounted on the external surface of the reactor and expanded section. These were monitored continuously using a Honeywell TDC 3000 process computer. These thermocouples are referred to as "skin thermocouples". The skin thermocouples were located at about the distributor plate (actually about 2 inches above the plate), and at 1 foot, 2 feet, 3 feet, 5 feet, and 8 feet above the distributor plate and at the cone. All skin thermocouples except the one located at the cone extended about 1/8 inch into the bed. The cone skin thermocouple was flush with the reactor wall and was located exactly at the halfway point of the cone.

General Procedure for Moving From High to Low Bed Level

The following is a general procedure for moving from the standard high bed level conditions noted above to low bed level conditions and continuing operation of a gas phase fluidized bed reactor:

The catalyst feed is stopped about 15 minutes prior to
    lowering the bed from neck level. This will ensure that
    resin left or deposited in the expanded section as the
    bed level drops, does not contain fresh catalyst. This will help to mitigate the possibility of forming an expanded section sheet during the bed lowering step.

The bed is lowered to about 40 to 50% of its original height as quickly as possible. If the cycle gas velocity is to be reduced, it is done by a step change prior to lowering the bed.

The ethylene ($C_2$) partial pressure is decreased starting immediately when the bed level decrease is initiated by stopping monomer feed. Comonomer feed may also be stopped or adjusted. The $H_2$ feed is adjusted to maintain the correct concentration. The reaction temperature, $C_x/C_2$ and $H_2$ concentrations are lowered steadily to the new target as the $C_2$ partial pressure falls. The target ethylene partial pressure is 120 psi. Make-up pressure on the reactor is switched to nitrogen gas ($N_2$) to maintain constant total pressure.

The catalyst feed is restarted when the production rate reaches about 40% of its value at full bed level. Generally, the objective is to run the reactor at a production rate that is proportional to the remaining bed weight relative to the full reactor, and in some cases even lower to achieve about the same overall catalyst productivity at the lower ethylene partial pressure. For example, if the production rate is 40 pph (pounds per hour) at full bed it would be 20 pph at half-weight and then about 15 pph to account for the lower $C_2$ partial pressure. This translates to about a 4 to 5 hour residence time at a low bed level.

Chemical Agents to Improve Low Bed Level Transitions

AS-990 is an ethoxylated stearyl amine that functions as an anti-static agent and/or resin/wall surface modifier and as such has a calming effect on reactor continuity. L-Malic Acid poisons active catalyst in the expanded section as it heats up, thus preventing sheeting; that is, L-malic acid is triggered by melting, and then it deactivates active catalyst locally before it can react.

Example 1

This example describes an improved low bed level transition, i.e. a transition to low-bed level at low-ethylene partial pressure and/or low cycle gas velocity conditions.

The reactor was started on a seedbed of 1 MI/0.920 EX-381 resin making product at normal conditions. The cone, reactor walls, and distributor plate were relatively clean prior to starting.

Catalyst addition was stopped 15 minutes before the lowering of the bed. The bed weight was lowered steadily from 150 to 90 lbs over period of about 1 hour. The fluidized bulk density increased from about 19.5 to 21 lb/ft$^3$ with a slightly narrower bandwidth. The bed weight differential pressure (dP) narrowed. The 5-ft. tap reading moved to about zero and intermittently registered a value. The bed level was about 4.5 ft. above the distributor plate during this low bed operation.

The ethylene partial pressure in the reactor was decreased from 210 to 140 psi essentially simultaneously with the lowering of the bed weight. The comonomer feed was stopped to maintain the $C_6/C_2$ ratio at a constant level. The $H_2$ partial pressure was reduced to the range of 570–600 ppm and the total pressure within the reactor was held at 350 psi by the addition of makeup pressure with $N_2$. The hydrogen partial pressure and the $C_6/C_2$ setpoints were maintained to keep the melt index (MI) and density of the polymer product within intended specifications.

The cycle gas velocity was reduced in two steps from 2.2 to 1.8 ft/sec as the bed level decreased. The cycle gas velocity was lowered from 2.2 to 1.8 ft/sec when the bed lowering was started. The cycle gas velocity was then lowered from 2.0 to 1.8 ft/sec when bed level was halfway to 85 lbs.

When the desired low bed, low $C_2$ and low cycle gas velocity levels were reached, the bed was allowed to fluidize for an hour while monitoring for changes in static and bed thermocouple activity. If the skin thermocouples exothermed in the expanded section or the skin thermocouples dropped very low in the bed, the catalyst feed would have been stopped and the fluidized bed would be allowed to circulate for a sufficient period to allow the bed to recover to a steady-state condition.

Then the catalyst was started at 30% of the previous rate. The rate of catalyst feed was brought up over a 2 hour period to achieve a polymer production rate of 20 pph of resin.

Results

The bed and 1-foot skin thermocouples dropped low as the bed level was decreased. Well before catalyst feed was started, the static broadened and corresponded to activity on the 2 and 3-foot skin thermocouples. This was the state of the reactor when a little more than six hours after lowering the bed level the catalyst feed was started. That static cleared up a few hours later and the skin activity subsided. Both returned for a short period later, accompanied by erratic activity at the 8-foot skin thermocouple. The cone thermocouple did not exotherm after the catalyst feed was started.

The reaction was initiated with the introduction of catalyst and steadily increased for 4 hours at a slow rate. The cone was slowly warming during this time. The reaction then started to diminish, beginning about four hours after starting catalyst. This lasted for 2 hours, during which time the cone thermocouple dropped several degrees lower. The plate thermocouple cleaned up at the same time. After two hours, the reaction came on strongly and the cone thermocouple again warmed up. This corresponded to a second episode of static broadening. The cone started to cool again after a couple of hours and static later subsided and the erratic skin thermocouple behavior passed.

By the end of two days prior to shutting down, the cone thermocouple had drifted down to about 28° C. below bed temperature. The other skin thermocouples had stabilized and all except the 1-foot level had cleared. It ran about 9° C. low.

Resin screened through ½ inch mesh showed an absence of agglomerates when running at normal bed level. But ½ to 1-inch agglomerates showed up after the reactor transitioned to low bed, low ethylene, low cycle gas velocity conditions. Lowering the ethylene partial pressure appears to improve low-bed-level operations and therefore provide an intermediate transition method between a bed dump and a full bed transition.

Example 2

This example describes a transition to low-bed level, low-ethylene partial pressure and low cycle gas velocity conditions with the addition of AS-990.

The reactor was started on a seedbed of 1 MI/0.920 EX-381 resin making product at normal conditions. The expanded section and cone were blown clean prior to start-up.

Kemamine AS-990, an ethoxylated stearyl amine commercially available from Witco Chemical Corporation, was dispersed as a 10-wt % slurry in purified Kaydol mineral oil and added to the reactor via an injection tube using a slurry catalyst feeder. Carrier flows of nitrogen ($N_2$) with or without isopentane were swept it into the bed via an injection tube entering the bed at about the 2 foot level. The 10-wt % AS-990 in Kaydol mineral oil was fed by a syringe pump at 20 cc/hr for 1 hr with 2 pph $N_2$ carrier and 2 pph isopentane carrier.

AS-990 in the mineral oil slurry, added over an hour's time, built a concentration of approximately 20 ppmw AS-990 in the bed. This had a calming effect on static and skin thermocouples and caused no loss in catalyst productivity at normal bed conditions. The cone thermocouple settled within 2° C. of the bed and catalyst activity remained good.

Catalyst addition was stopped an hour later and the lowering of the bed began about 15 minutes later. The bed weight was lowered steadily from 150 to 85 lbs over a period of 1 hour. The fluidized bulk density remained at about 20 lb/ft³ but had a narrower bandwidth. The bed weight dP narrowed. The 5-ft tap reading moved to about zero and intermittently registered a value. The bed height was about 4.2 ft.

The ethylene partial pressure in the reactor was decreased from 210 to 140 psi essentially simultaneously with the lowering of the bed weight. The comonomer feed was stopped to maintain the $C_6/C_2$ ratio at a constant level. The $H_2$ partial pressure was reduced to the range of 570–600 ppm and the total pressure within the reactor was held at 350 psi by the addition of makeup pressure with $N_2$. The hydrogen partial pressure and the $C_6/C_2$ setpoints were maintained to keep the melt index (MI) and density of the polymer product within intended specifications.

The cycle gas velocity was reduced in two steps from 2.2 to 1.8 ft/sec as the bed level decreased. The cycle gas velocity was lowered from 2.2 to 2.0 ft/sec when the bed lowering was started. The cycle gas velocity was then lowered from 2.0 to 1.8 ft/sec when the bed level was halfway to 85 lbs.

When the desired low bed, low $C_2$ and low cycle gas velocity levels were reached, the bed was allowed to fluidize for an hour while looking for changes in static and bed thermocouple activity. If the skin thermocouples exo-thermed in the expanded section or the skin thermocouples dropped very low in the bed, the catalyst feed would have been stopped and the fluidized bed would be allowed to circulate for a sufficient period of time to allow the bed to recover to a steady-state condition.

Then the catalyst was started at 30% of previous rate. The rate of catalyst feed was brought up over a 2 hour period to achieve a polymer production rate of 20 pph of resin.

In addition, the AS-990 feed was turned back on at 1 cc/hr with 2 pph $N_2$ carrier and 0.5–1.0 pph isopentane carrier.

Results

The cone skin thermocouple dropped from −1 to −4° in response to lowering the bed. Catalyst feed was resumed two hours after starting the transition and the reaction came on steadily without interruption. AS-990 continuous feed was initiated 2 hours after starting the catalyst, but at less than the aim feed rate. Steady-state concentration in the bed was only 7 ppmw. AS-990 moved the static slightly positive.

The cone thermocouple started to warm 4 hours after initiating catalyst feed (2 hours after starting AS-990 feed). It peaked about 1.8° C. above bed temperature within 2 hours and then began a slow decline that eventually reached −9° C. below the bed temperature 12 hours into the transition. The 1-foot skin thermocouple cooled a few degrees during this time, but other thermocouples remained steady.

The AS-990 feed rate was increased by a factor of three (to a 20-ppmw steady-state concentration) in response to the low cone temperature. The rate of descent of the cone temperature tapered off and turned upwards within two hours. Other skin thermocouples similarly responded, moving closer to the bed temperature. Within another 2 hours the cone thermocouple passed through a phase where it quickly warmed to within 5° C. of the bed. Over the next 12 hours the cone thermocouple slowly moved steadily closer to the bed temperature reaching within about 2° C. near the end of the run. Other thermocouples had their closest approach to bed temperature about four hours after starting continuous AS-990 addition and then very slowly drifted lower. Static steadied out at about 100 volts in the presence of the AS-990.

The reactor was run 28 hours at low bed conditions before inspection shutdown. Approximately 16.5 hours were with continuous AS-990 feed at the 20-ppmw level.

Screening drums caught essentially no resin agglomerates during normal operation, and no resin agglomerates during the AS-990 low-bed, low-ethylene, low cycle gas velocity test.

The cone was clean down to bare metal in most areas. There remained a very thin region of resin only about ⅟32 inch thick adhered to the 5–6 inch vertical band above the cone. The middle of the cone was relatively clean. A very small amount of resin remained in the very lower portion of the cone, only maybe ¼ inch thick. It was not fused and easily brushed away. It could not be reached and was not sampled.

The expanded section contained a thin resin layer. The straight section of the lower reactor was clean. There was no lip of resin at the joining of the cone and lower section.

A small sheet was found lying on the distributor plate. It was composed of a couple of sections that collectively formed a ring. The shape and contours suggested it formed in the very lower portion of the cone and the top of the straight section.

Thus, the addition of AS-990 cleaned up the cone section and improved operability during low-bed operation. It also prevented formation of ½ inch resin agglomerates, a characteristic phenomenon for low-bed operation. Although a sheet formed, it was much smaller and less significant than sheet formation without AS-990 injection.

There may be an optimal level for the AS-990. With what appeared to be an insufficient amount, the cone thermocouple was depressed and falling indicative of resin accumulation in that area. Near the optimal level, the cone cleaned up and the other skin thermocouples exhibited their narrowest temperature spread during the entire investigation. Above the optimal level, the cone thermocouple continued to clean up and the other skin thermocouples slightly diverged. The optimal level of AS-990 appears to be about 20 ppmw in the seedbed resin.

AS-990 not only caused the cleaning of the expanded section down to bare metal, but also eliminated the cloud of dust above the bed, indicating that entrainment of fines was also reduced.

A run summary and the results of Examples 1 and 2 are shown in Table 1 below.

TABLE 1

Examples 1 and 2 Run Summary - Conditions and Resin Properties

|  | Example: | | | |
| --- | --- | --- | --- | --- |
|  | Ex. 1 | Ex. 1 | Ex. 2 | Ex. 2 |
| Bed Level | Normal | Low | Normal | Low |
| SGV Rate | Normal | Low | Normal | Low |
| Ethylene Conc. | Normal | Low | Normal | Low |
| Additive | None | None | None | AS-990 |
| Catalyst: | EX-381 | EX-381 | EX-381 | EX-381 |
| Reaction Conditions: | | | | |
| Rx Temp. C. | 85 | 85 | 85 | 85 |
| Rx Pressure, psig | 347 | 347 | 347 | 347 |
| Ethylene Partial, psia | 210 | 140 | 210 | 140 |
| H2, ppm (Analyzer Miscalibrated) | 1015 | 570 | 1070 | 610 |
| H2/C2 Gas Mole Ratio (Miscalibration) | 0.00175 | 0.00147 | 0.00184 | 0.00158 |
| C6/C2 Gas Mole Ratio | 0.0081 | 0.0090 | 0.0090 | 0.0090 |
| N2, psi | 150 | 220 | 150 | 220 |
| Catalyst Feed Rate, shots/min | 3.5 | 3.0 | 3.0 | 3.25 |
| Superficial Gas Velocity, ft/sec | 2.1 | 1.8 | 2.15 | 1.8 |
| Fluidized Bulk Density, lb/ft3 | 19.5 | 21 | 21 | 20 |
| Settled Bulk Density, lb/ft3 | 27.9 | 29.1 | 28.4 | 28.8 |
| Corrected Bed Weight, lb | 150 | 90 | 150 | 85 |
| Nominal Bed Height, ft | 8.1 | 4.5 | 7.5 | 4.2 |
| Production Rate, lb/hr | 35 | 24 | 30 | 27 |
| STY, lb/hr/ft3 | 4.6 | 5.6 | 4.2 | 6.4 |
| Residence Time, hr | 4.3 | 3.8 | 5.0 | 3.1 |
| Al in Resin by X-Ray, ppmw | 22 | 29 | 21 | 47 |
| Zr in Resin by X-Ray, ppmw | 0.51 | 0.84 | 0.47 | 0.90 |
| Al/Zr Mole Ratio in Resin by X-Ray, ppmw | 83 | 67 | 86 | 101 |
| Additive for Low Bed Operation | None | None | None | AS-990 |
| Additive in What? | — | — | — | Kaydol Min. Oil |
| Additive Diluent Concentration, wt % | — | — | — | 10 wt % |
| Diluted Additive Feed Rate, cc'hr | — | — | — | 3.0 |
| Additive N2 Carrier, lb/hr | — | — | — | 3.0 |
| Additive Isopentane Carrier, lb/hr | — | — | — | 0.5 |
| Additive Feed Location | — | — | — | To Bed |
| Additive Resin Concentration, ppmw | 0 | 0 | 0 | 20 ppmw |
| Resin Properties: | | | | |
| MI, dg/min (12) | 1.20 | 1.18 | 1.17 | 1.04 |
| FI, dg/min (121) | 48.6 | 52 | 46.9 | 48.7 |
| MFR (121/12) | 40.6 | 44 | 40 | 46.6 |
| Density, g/cc | 0.9227 | 0.9196 | 0.9190 | 0.9190 |
| Resin APS, inch (After ½ inch Screen) | 0.0438 | 0.0367 | 0.0451 | 0.0363 |
| 10 Mesh | 0.93 | 0.65 | 1.49 | 0.18 |
| 18 Mesh | 56.67 | 35.55 | 59.64 | 36.01 |
| 35 mesh | 38.52 | 53.00 | 35.29 | 52.41 |
| 60 mesh | 3.70 | 10.06 | 3.08 | 10.52 |
| 120 mesh | 0.19 | 0.65 | 0.30 | 0.80 |
| 200 mesh | 0.00 | 0.08 | 0.10 | 0.08 |
| Pan | 0.00 | 0.00 | 0.10 | 0.00 |
| Agglomerates on ½ inch Screen, grams/drum | 0 wt % | 27 to 190 g | 0 wt % | 3 to 8 g |
| Agglomerates on ½ inch Screen, wt % | 0 wt % | 0.10 to 0.49 wt % | 0 wt % | 0.008 to 0.023 wt % |

While the present invention has been described and illustrated by reference to particular embodiments, it will be appreciated by those of ordinary skill in the art that the invention lends itself to variations not necessarily illustrated herein. For example, it is not beyond the scope of this invention to transition between one or more mixed catalysts to one or more incompatible mixed catalysts and vice-versa or between a Ziegler-Natta catalyst and a chromium catalyst. It is also contemplated by the invention that one or more reactors can be used, where the process of the invention takes place within a first reactor or within a second reactor or in an intermediate location before entering the first (when one reactor is being used) or the second reactor (when two or more reactors are being used in series or otherwise). For this reason, then, reference should be made solely to the appended claims for purposes of determining the true scope of the present invention.

What is claimed is:

1. A process for transitioning from a first polymerization reaction conducted in the presence of a first catalyst system to a second polymerization reaction conducted in the presence of a second catalyst system wherein the first and second catalyst systems are incompatible, the polymerization reaction being conducted in a polymerization zone of a gas phase fluidized bed reactor which contains a fluidized bed of polymer particles by the essentially continuous passage of monomer gased through the polymerization zone, comprising:
   a) discontinuing the introduction of the first catalyst system into the reactor;
   b) lowering the height of the bed of polymer particles from a first height to a second height;
   c) introducing the second catalyst system into the reactor; and d) increasing the height of the bed of polymer particles to a level above the level of the second height.

2. The process of claim 1 wherein at least one of the catalyst systems includes a metallocene or transition metal containing component.

3. The process of claim 1 wherein one of the catalyst systems includes a metallocene component and the other catalyst system contains a transition metal component.

4. The process of claim 1 wherein the monomer gas comprises ethylene or ethylene and one or more higher alpha olefin monomers.

5. The process of claim 1 further comprising conducting essentially concurrently with the reduction of the height of the bed of polymer particles, at least one modification selected from the group consisting of:
reducing the partial pressure of the monomer gases within the polymerization zone from a first partial pressure to a second lower partial pressure;
reducing the velocity of the monomer gases passing through the reactor from a first velocity to a second velocity; and
introducing an alkoxylated amide or amine into the reactor.

6. The process of claim 5 wherein the partial pressure of the monomer gases present in the polymerization zone is reduced from a first partial pressure to a second lower partial pressure essentially concurrently with the lowering of the height of the bed of polymer particles.

7. The process of claim 6 wherein the second partial pressure of the monomer gases present in the polymerization zone is about 40 to about 90% of the first partial pressure of the monomer gases present in the polymerization zone.

8. The process of claim 7 wherein the second partial pressure of the monomer gases present in the polymerization zone is about 50 to about 70% of the first partial pressure of the monomer gases present in the polymerization zone.

9. The process of claim 6 wherein the partial pressure of the monomer gases present in the polymerization zone is increased from the second partial pressure to a higher level partial pressure essentially concurrently with the increase in the height of the bed of polymer particles.

10. The process of claim 5 wherein the velocity of the monomer gases passing through the reactor is reduced from a first velocity to a second velocity essentially concurrently with the reduction of the height of the bed of polymer particles.

11. The process of claim 10 whereby the velocity of the monomer gases passing through the reactor is reduced from a first velocity of about 2.1 to about 2.4 ft/sec to a second velocity of about 1.7 to about 1.8 ft/sec.

12. The process of claim 10 wherein the velocity of the monomer gases is increased to a level above the level of the second velocity essentially concurrently with the increase in the height of the bed of polymer particles.

13. The process of claim 5 wherein essentially concurrently with the reduction of the height of the bed of polymer particles, the partial pressure of the monomer gases within the polymerization zone is reduced from a first partial pressure to a second lower partial pressure and the velocity of the monomer gases passing through the reactor is reduced from a first velocity to a second velocity.

14. The process of claim 13 wherein essentially concurrently with the increase in the height of the bed of polymer particles, the partial pressure of the monomer within the polymerization zone is increased to a level above the second partial pressure and the velocity of the monomer gases is increased to a level above the second velocity.

15. The process of claim 5 further comprising introducing an alkoxylated amide or amine into the reactor essentially concurrently with the reduction of the height of the bed of polymer particles.

16. The process of claim 15 wherein said alkoxylated amide or amine comprises an ethoxylated fatty acid amine.

17. The process of claim 16 wherein said alkoxylated amide or amine comprises ethoxylated stearyl amine.

18. The process of claim 1 further comprising introducing an alkoxylated amide or amine into the reactor prior to discontinuing the introduction of the first catalyst system into the reactor.

19. The process of claim 18 wherein the alkoxylated amide or amine is maintained within the polymerization zone at a concentration of from about 1 to about 1000 ppmw during the transition from the first catalyst system to the second catalyst system.

20. The process of claim 19 wherein the alkoxylated amide or amine is maintained within the polymerization zone at a concentration of about 15 to about 25 ppmw during the transition from the first catalyst system to the second catalyst system.

21. The process of claim 1 wherein the second height of the bed of polymer particles is about 10 to about 90% of the first height of the bed of polymer particles.

22. The process of claim 20 wherein the second height of the bed of polymer particles is about 40 to about 60% of the first height of the bed of polymer particles.

23. The process of claim 22 wherein the second height of the bed of polymer particles is about 50% of the first height of the bed of polymer particles.

24. The process of claim 21 wherein the height of the bed of polymer particles is reduced from the first height to the second height during a period of about 1 to about 5 hours.

25. The process of claim 24 wherein the second height of the bed of polymer particles is reduced from the first height to the second height during a period of about 1 to about 2 hours.

26. The process of claim 1 wherein following the discontinuation of the introduction of the first catalyst system into the reactor and prior to the lowering of the height of the bed of polymer particles, polymerization conditions are maintained in the reactor and polymerization is permitted to continue for a period of time to allow the components of the first catalyst system present in the reactor to produce additional polymer particles.

27. The process of claim 26 wherein the components of the first catalyst system present in the polymerization zone are permitted to produce additional polymer for a period of up to 5 hours after discontinuing the introduction of the first catalyst system into the polymerization zone.

28. The process of claim 27 wherein the components of the first catalyst system present in the reactor are permitted to produce additional polymer for a period of up to 15 minutes after discontinuing the introduction of the first catalyst system into the reactor.

29. The process of claim 1 wherein the second catalyst system is not introduced into the reactor until after essentially all of the first catalyst system has been consumed in the course of the first polymerization reaction.

30. The process of claim 1 further comprising permitting the components of the second catalyst system present in the reactor to produce polymer particles for a period of time before increasing the height of the bed of polymer particles to a level above the level of the second height.

31. The process of claim 30 wherein the components of the second catalyst system present in the reactor are permitted to produce polymer particles for a period of up to 48 hours before increasing the height of the bed of polymer particles to a level above the level of the second height.

32. The process of claim 31 wherein the components of the second catalyst system present in the reactor are permitted to produce polymer particles for a period of about 1 to about 12 hours before increasing the height of the bed of polymer particles to a level above the level of the second height.

33. A process for transitioning from a first polymerization reaction conducted by the essentially continuous passage of monomer gases through the polymerization zone of a gas phase fluidized bed reactor in the presence of a first catalyst system to a second polymerization reaction conducted in the presence of a second catalyst system, wherein said monomer polymerization reaction is conducted in the polymerization zone of said reactor which contains a fluidized bed of polymer particles, wherein said reactor comprises a cycle gas line, comprising:
   a) discontinuing the introduction of the first catalyst system into the reactor;
   b) lowering the height of the bed of polymer particles from a first height to a second height;
   c) essentially concurrently with the reduction of the height of the bed of polymer particles, reducing the entrainment of fines from the fluidized bed of polymer particles;
   d) introducing the second catalyst system into the reactor; and
   e) increasing the height of the bed of polymer particles to a level above the level of the second height.

34. The process of claim 33 wherein at least one of the catalyst systems includes a metallocene or transition metal containing component.

35. The process of claim 33 wherein one of the catalyst systems includes a metallocene component and the other catalyst system contains a transition metal component.

36. The process of claim 33 wherein the monomer gas comprises ethylene or ethylene and one or more higher alpha olefin monomers.

37. The process of claim 33 wherein the entrainment of fines is reduced by at least one modification selected from the group consisting of:
   reducing the velocity of the monomer gases passing through the reactor from a first velocity to a second velocity;
   reducing the total pressure in the reactor;
   reducing the cycle gas density;
   increasing the average particle size of polymer particles in the fluidized bed;
   narrowing the particle size distribution of polymer particles in the fluidized bed; and
   changing the morphology of the particles whereby the sphericity of the particles is reduced.

38. The process of claim 37 wherein the entrainment of fines is reduced by reducing the velocity of the monomer gases passing through the reactor from a first velocity to a second velocity essentially concurrently with the reduction of the height of the bed of polymer particles.

39. The process of claim 38 wherein the velocity of the monomer gases passing through the reactor is reduced from a first velocity of about 2.1 to about 2.4 ft/sec to a second velocity of about 1.0 to about 1.5 ft/sec.

40. The process of claim 37 wherein the entrainment of fines is reduced by reducing the total pressure in the reactor to a total pressure in the range of about 50 to about 250 psi.

41. The process of claim 37 wherein the entrainment of fines is reduced by reducing the cycle gas density to a density of about 0.5 to about 1.2 lb/ft$^3$.

42. The process of claim 37 wherein the entrainment of fines is reduced by increasing the average particle size of polymer product to a size in the range of about 0.025 to about 0.15 inches.

43. The process of claim 37 wherein the entrainment of fines is reduced by narrowing the particle size distribution of polymer product wherein from 0 to about 2 weight-percent of fines are less than 125 microns, or 0 to about 2 weight-percent of fines pass US 120 mesh.

44. The process of claim 37 wherein the entrainment of fines is reduced by changing the particle morphology of polymer product to have a reduced sphericity in the range of about 0.3 to about 0.7.

45. A process for transitioning from a first polymerization reaction conducted by the essentially continuous passage of monomer gases through the polymerization zone of a gas phase fluidized bed reactor in the presence of a first catalyst system to a second polymerization reaction conducted in the presence of a second catalyst system, wherein said monomer polymerization reaction is conducted in the polymerization zone of said reactor which contains a fluidized bed of polymer particles, comprising:
   a) discontinuing the introduction of the first catalyst system into the reactor;
   b) lowering the height of the bed of polymer particles from a first height to a second height;
   c) essentially concurrently with the reduction of the height of the bed of polymer particles, reducing the fluidized bulk density of the fluidized bed of polymer particles;
   d) introducing the second catalyst system into the reactor; and
   e) increasing the height of the bed of polymer particles to a level above the level of the second height.

46. The process of claim 45 wherein at least one of the catalyst systems includes a metallocene or transition metal containing component.

47. The process of claim 45 wherein one of the catalyst systems includes a metallocene component and the other catalyst system contains a transition metal component.

48. The process of claim 45 wherein the monomer gas comprises ethylene or ethylene and one or more higher alpha olefin monomers.

49. The process of claim 45 wherein the fluidized bulk density is reduced by at least one modification selected from the group consisting of:
   increasing the velocity of the monomer gases passing through the reactor from a first velocity to a second velocity;
   increasing the cycle gas density;
   selecting a second catalyst that produces a product having a lower fluidized bulk density particle or one that produces a lower fluidized density than the product produced by the first catalyst;
   reducing the average particle size of polymer particles in the fluidized bed; and
   changing the morphology of the particles whereby the sphericity of the particles is reduced.

50. A process for transitioning from a first polymerization reaction conducted in the presence of a first catalyst system to a second polymerization reaction conducted in the presence of a second catalyst system, the polymerization reaction being conducted in a polymerization zone of a gas phase fluidized bed reactor which contains a fluidized bed of polymer particles by the essentially continuous passage of monomer gases through the polymerization zone, comprising:

a) discontinuing the introduction of the first catalyst system into the reactor;

b) introducing a poison or behavior modifier for the first catalyst system to inhibit said first polymerization reaction;

c) lowering the height of the bed of polymer particles from a first height to a second height;

d) essentially concurrently with the lowering of the height of the bed of polymer particles the partial pressure of the monomer gases within the polymerization zone is reduced from a first partial pressure to a second lower partial pressure;

e) essentially concurrently with the lowering of the height of the bed of polymer particles the velocity of the monomer gases passing through the reactor is modified from a first velocity to a second velocity;

f) introducing the second catalyst system into the reactor;

g) increasing the height of the bed of polymer particles to a level above the level of the second height; and h) essentially concurrently with the increase of the height of the bed of polymer particles to the second height, the partial pressure of the monomer gases within the polymerization zone is increased to a level above the second partial pressure and the velocity of the monomer gases passing through the reactor is adjusted to the first velocity.

51. The process of claim 50, wherein the velocity of the monomer gases passing through the reactor is modified from a first velocity to a second higher velocity to reduce the fluidized bulk density of the bed of polymer particles.

52. The process of claim 50, wherein the velocity of the monomer gases passing through the reactor is modified from a first velocity to a second lower velocity to reduce the entrainment of active particles of the first catalyst system above the level of the bed of polymer particles.

53. The process of claim 50, wherein essentially concurrently with the lowering of the bed of polymer particles, fouling of the walls of the reactor is inhibited by at least one device selected from the group consisting of acoustic hammers, sonic hammers, tangential flow cleaning systems and external wall temperature control systems.

54. The process of claim 50, wherein said second catalyst system is introduced into the reactor in a modified form wherein said second catalyst system is less active.

55. The process of claim 54, wherein said second catalyst system is modified to standard activity essentially concurrently with the increase of the height of the bed of polymer particles to the second height, the increase of the partial pressure of the monomer gases within the polymerization zone to a level above the second partial pressure and the adjustment of the velocity of the monomer gases passing through the reactor to the first velocity.

56. A process for transitioning from a first polymerization reaction producing a first polymer to a second polymerization reaction producing a second polymer, wherein both the first and second polymers are produced in presence of the same polymerization catalyst system, the polymerization reaction being conducted in a polymerization zone of a gas phase fluidized bed reactor that contains a fluidized bed of polymer particles by the essentially continuous passage of monomer gases through the polymerization zone and the polymers are discharged from the reactor into a discharge system, comprising:

a) discontinuing the introduction of the catalyst system into the reactor;

b) lowering the height of the bed of polymer particles from a first height to a second height by controlling the discharge system to provide an increased discharge rate;

c) setting the reactor conditions to produce the second polymer; and d) increasing the height of the bed of polymer particles to a level above the level of the second height.

* * * * *